United States Patent
Stockert et al.

(10) Patent No.: US 11,470,181 B2
(45) Date of Patent: *Oct. 11, 2022

(54) APPLICATION MANAGEMENT OF NETWORK SLICES WITH LEDGERS

(71) Applicant: AT&T Intellectual Property I, L.P., Atlanta, GA (US)

(72) Inventors: Mark Stockert, San Antonio, TX (US); Linda Baughman, Bloomfield Hills, MI (US); Eric Zavesky, Austin, TX (US); James Pratt, Round Rock, TX (US); Michael Gonzales, Austin, TX (US); Pamela Stuckman, Kalkaska, MI (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 41 days.

This patent is subject to a terminal disclaimer.

(21) Appl. No.: 17/181,316

(22) Filed: Feb. 22, 2021

(65) Prior Publication Data

US 2021/0176334 A1    Jun. 10, 2021

Related U.S. Application Data

(63) Continuation of application No. 16/519,633, filed on Jul. 23, 2019, now Pat. No. 10,965,777.

(51) Int. Cl.
| | |
|---|---|
| *H04L 67/60* | (2022.01) |
| *G06F 16/23* | (2019.01) |
| *G06Q 50/18* | (2012.01) |

(52) U.S. Cl.
CPC .......... *H04L 67/60* (2022.05); *G06F 16/2365* (2019.01); *G06Q 50/18* (2013.01)

(58) Field of Classification Search
None
See application file for complete search history.

(56) References Cited

U.S. PATENT DOCUMENTS

| | | |
|---|---|---|
| 10,623,257 B1 | 4/2020 | Marquardt et al. |
| 2019/0174536 A1* | 6/2019 | Han ................. H04W 74/0833 |

(Continued)

OTHER PUBLICATIONS

Non Final office action received for U.S. Appl. No. 16/519,633 dated Jul. 17, 2020, 23 Pages.

(Continued)

*Primary Examiner* — Jeffrey R Swearingen
(74) *Attorney, Agent, or Firm* — Amin, Turocy & Watson, LLP

(57) ABSTRACT

The technologies described herein are generally directed to facilitating the allocation, scheduling, and management of network slice resources. According to an embodiment, a system can comprise a processor and a memory that can store executable instructions that, when executed by the processor, facilitate performance of operations. The operations can include receiving proposed contract data representative of a proposed contract for access by an application of a user equipment device to resources of a network slice usable for the access by the application. The operations can further include, based on the proposed contract data, storing governing contract data representative of a governing contract in a storage device, with the governing contract being selected to control the access by the application to the resources of the network slice. The operations can further include scheduling use of the resources of the network slice by the application based on the governing contract data.

20 Claims, 10 Drawing Sheets

(56) References Cited

U.S. PATENT DOCUMENTS

2019/0191464 A1* 6/2019 Loehr .................. H04W 72/14
2019/0230681 A1* 7/2019 Han ..................... H04W 24/10
2020/0029250 A1 1/2020 Ibek et al.

OTHER PUBLICATIONS

Bisarai, et al. "Recalibrating Resource Profiles for Network Slices in a 5G or Other Next Generation Wireless Network." U.S. Appl. No. 16/804,392, filed Feb. 28, 2020. 46 pages.
Mhapsekar, et al. "Modifying Capacity Assigned to Support a Network Slice Allocated to a User Device in a 5G or Other Next Generation Wireless Network." U.S. Appl. No. 16/804,472, filed Feb. 28, 2020. 45 pages.
Wray "5G for emergency services: Slicing through the complexity." hllps://inform.tmforum.org/catalysl/2019/05/5g-emergency-services-slicing-complexity/. May 2019. 4 pages.
Stockert, et al. "Management of Persistent Network Slices by a Distributed Learning System in a 5G or Other Next Generation Wireless Network." U.S. Appl. No. 16/700,055, filed Dec. 2, 2019. 51 pages.

* cited by examiner

APPLICATION MANAGEMENT OF
NETWORK SLICES WITH LEDGERS

RELATED APPLICATION

The subject patent application is a continuation of, and claims priority to, U.S. patent application Ser. No. 16/519,633, filed Jul. 23, 2019, and entitled "APPLICATION MANAGEMENT OF NETWORK SLICES WITH LEDGERS," the entirety of which application is hereby incorporated by reference herein.

TECHNICAL FIELD

The subject application is related to wireless communication systems, and, for example, the allocation of resources to user equipment devices (UEs) in a wireless network.

BACKGROUND

Fifth generation (5G) wireless communications can facilitate the abstraction of network services into network slices managed by the provider of the network. Even with provider management, some types of applications can have requirements that exceed, in some circumstances, the capacity of this approach to rapidly adapt to circumstances, e.g., applications with emergency, high-bandwidth, low latency, or other future needs can be assigned slices with capacity that does not support the present or future needs of these and other types of applications.

Another problem that can cause problems with provider management of network slices in 5G is the rapid and accurate identification applications that show anomalous usage, and the resulting expulsion of user devices in appropriate circumstances.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
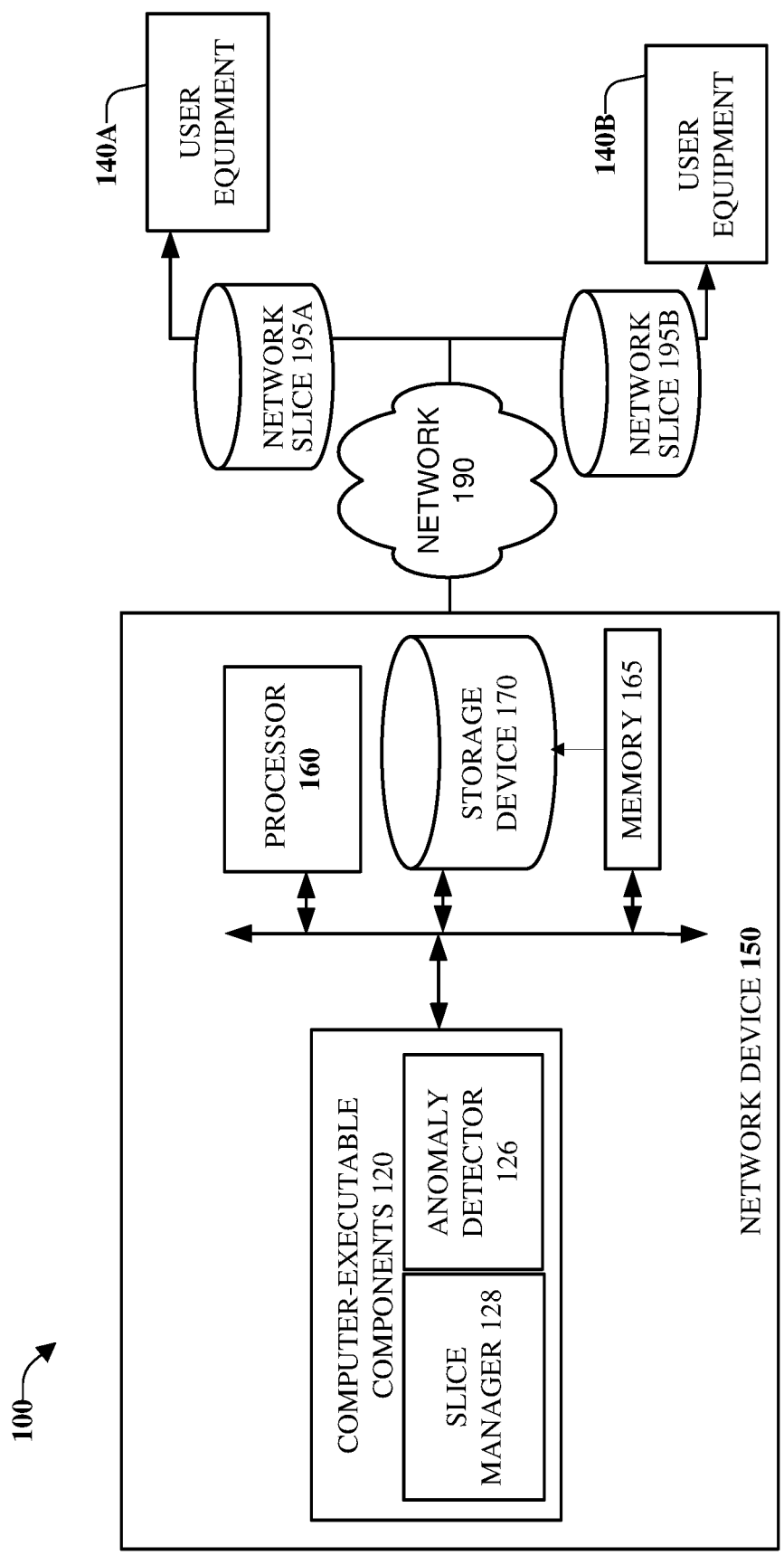
FIG. 1 is an architecture diagram of an example system that can facilitate the allocation and management of network slices for respective applications of UEs in accordance with one or more embodiments.

Generally speaking, one or more embodiments described herein can facilitate the allocation, scheduling, and management of network slice resources using different approaches. One approach described herein can facilitate receiving a proposed contract for access by an application to resources of a network slice, and based on the proposed contract data, selecting a governing contract to control access to the resources of the network slice.

In addition, one or more embodiments described herein can be directed towards a multi-connectivity framework that supports the operation of New Radio (NR, sometimes referred to as 5G). As will be understood, one or more embodiments can allow an integration of UEs with network assistance, by supporting control and mobility functionality on cellular links (e.g. LTE or NR). One or more embodiments can provide benefits including, system robustness, reduced overhead, and global resource management, while facilitating direct communication links via a NR sidelink.

It should be understood that any of the examples and terms used herein are non-limiting. For instance, while examples are generally directed to non-standalone operation where the NR backhaul links are operating on mmWave bands and the control plane links are operating on sub-6 GHz LTE bands, it should be understood that it is straightforward to extend the technology described herein to scenarios in which the sub-6 GHz anchor carrier providing control plane functionality could also be based on NR. As such, any of the examples herein are non-limiting examples, any of the embodiments, aspects, concepts, structures, functionalities or examples described herein are non-limiting, and the technology may be used in various ways that provide benefits and advantages in radio communications in general.

In some embodiments the non-limiting term "radio network node" or simply "network node," "radio network device or simply "network device" are used herein. These terms may be used interchangeably, and refer to any type of network node that can serve user equipment and/or be connected to other network node or network element or any radio node from where user equipment receives signal. Examples of radio network nodes are Node B, base station (BS), multi-standard radio (MSR) node such as MSR BS, gNodeB, eNode B, network controller, radio network controller (RNC), base station controller (BSC), relay, donor node controlling relay, base transceiver station (BTS), access point (AP), transmission points, transmission nodes, RRU, RRH, nodes in distributed antenna system (DAS), etc.

In some embodiments the non-limiting term user equipment (UE) is used. It can refer to any type of wireless device that can communicate with a radio network node in a cellular or mobile communication system. Examples of user equipment include, but are not limited to, a target device, device to device (D2D) user equipment, machine type user equipment or user equipment capable of machine to machine (M2M) communication, PDA, Tablet, mobile terminals, smart phone, laptop embedded equipped (LEE), laptop mounted equipment (LME), USB dongles, and other equipment that can provide similar functions. Example UEs are described further with FIGS. 9 and 10 below.

Some embodiments are described in particular for 5G new radio systems. The embodiments are however applicable to any radio access technology (RAT) or multi-RAT system where the user equipment operates using multiple carriers e.g. LTE FDD/TDD, WCMDA/HSPA, GSM/GERAN, Wi Fi, WLAN, WiMax, CDMA2000, etc.

Generally speaking, in one or more embodiments, a network device can provide network slicing with elements to support different types of services and requirements. The network slicing can distribute functionality for facilitating services to devices across the network and can be used to support multiple virtual networks behind interfaces of the communication network. The slicing of the network into multiple virtual networks can provide support for different Radio Access Networks (RAN) and different service types running across a single RAN. Further, in one or more embodiments, flexible distribution of the access, edge, and core elements of the network cloud can provide optimal support regarding latency and/or service isolation for different apps and service requirements.

FIG. 1 is an architecture diagram of an example system 100 that can facilitate the allocation and management of network slices 195A-B for respective applications of UEs 140A-B, in accordance with one or more embodiments.

System 100 can include network device 150 communicatively coupled to UEs 140A-B via network 190. According to multiple embodiments, network device 150 can include memory 165 that can store one or more computer and/or machine readable, writable, and/or executable components 120 and/or instructions that, when executed by processor 160, can facilitate performance of operations defined by the executable component(s) and/or instruction(s). For example, memory 165 can store computer and/or machine readable, writable, and/or executable components 120 and/or instructions that, when executed by processor 160, can facilitate execution of the various functions described herein relating to network device 150.

In some embodiments, memory 165 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 165 are described below with reference to system memory 1006 and FIG. 10. Such examples of memory 165 can be employed to implement any embodiments of the subject disclosure.

According to multiple embodiments, processor 160 can comprise one or more processors and/or electronic circuitry that can implement one or more computer and/or machine readable, writable, and/or executable components and/or instructions that can be stored on memory 165. For example, processor 160 can perform various operations that can be specified by such computer and/or machine readable, writable, and/or executable components and/or instructions including, but not limited to, logic, control, input/output (I/O), arithmetic, and/or the like. In some embodiments, processor 160 can comprise one or more central processing unit, multi-core processor, microprocessor, dual microprocessors, microcontroller, System on a Chip (SOC), array processor, vector processor, and/or another type of processor. Further examples of processor 160 are described below with reference to processing unit 1004 of FIG. 10. Such examples of processor 160 can be employed to implement any embodiments of the subject disclosure.

It should be appreciated that the embodiments of the subject disclosure depicted in various figures disclosed herein are for illustration only, and as such, the architecture of such embodiments are not limited to the systems, devices, and/or components depicted therein. For example, in some embodiments, network device 150 can further comprise various computer and/or computing-based elements described herein with reference to operating environment 1000 and FIG. 10. In one or more embodiments, such computer and/or computing-based elements can be used in connection with implementing one or more of the systems, devices, components, and/or computer-implemented operations shown and described in connection with FIG. 1 or other figures disclosed herein.

One or more embodiments of network device 150 can allocate resources of network slices 195A-B to UEs 140A-B, respectively. To enable the allocations by network slices 195A-B depicted in FIG. 1, using different approaches described below, one or more embodiments of network device 150 can facilitate receiving information corresponding to a proposed contract for access by applications of UE 140A to resources of network slices 195A, and based on the proposed contract data, selecting a governing contract to control access to the resources of the network slice 195A.

In one or more embodiments, slice manager 128 can dynamically identify a set of functions to be allocated to UEs 140A-B via network slices 195A-B. Example characteristics of network slices 195A-B are described in further detail with FIG. 2 below. As described in further detail below with FIG. 5, in some circumstances, anomaly detector 126 can detect anomalous activity in allocated network slices.

Figure 2:
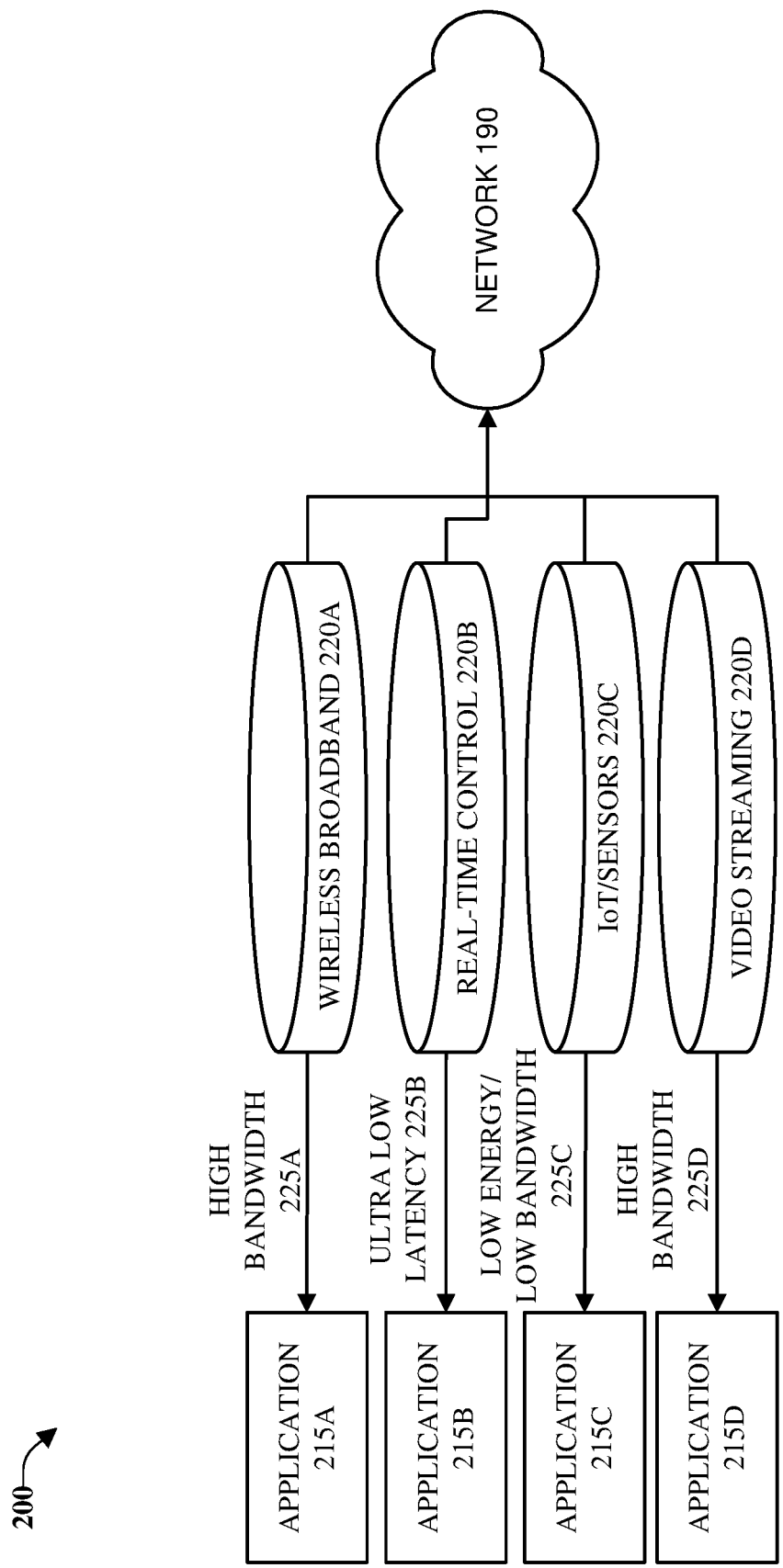
FIG. 2 illustrates an example system of network slices allocated to applications, in accordance with one or more embodiments.

FIG. 2 illustrates an example system 200 of network slices 220A-D allocated to applications 215A-D, in accordance with one or more embodiments. For purposes of brevity, description of like elements and/or processes employed in other embodiments is omitted.

In one or more embodiments, network slices can describe virtual networks with independent sets of logical network functions that can be selected to support particular requirements of different network applications. Applications, as a part of execution, can request allocation of a network slice having certain characteristics to facilitate successful program execution. Example characteristics of network slices can include, but are not limited to, location, speed, connectivity, latency, security, energy use, coverage, and capacity. Example, network slices 220A-D, configured with certain characteristics for certain applications, are discussed below.

In one or more embodiments, network slices can be optimized to provide the resources and network topology for the specific service and traffic required by applications 215A-D, these applications providing proposed contracts for, and using, resources of respective network slices. Different characteristics noted above, and throughout the present disclosure, can be allocated to meet the particular demands of each use case.

In an example, application 215A can require high-bandwidth 225A to facilitate wireless broadband network slice 220A. An example of application 215A can be a web browser that requires wireless broadband network slice 220A to deliver web content. In another example, application 215B can require ultra-low latency 225B to facilitate real-time control 220B. As discussed further in examples below, in an example, application 215B can utilize real-time control 220B to rapidly and dynamically control a flying drone. In another example, application 215C can utilize a low energy/low bandwidth 225C to facilitate efficient control of IoT sensors 220C. Specific approaches described further herein can also facilitate the developing 5G IoT to discover and adhere to slice-defined limitations. In another example, application 215D can require a high bandwidth 225D to facilitate video streaming 220D. One having skill in the relevant art(s), given the description herein, will appreciate that the above descriptions of applications that can utilize one or more embodiments is non-limiting, and other applications can be allocated combinations of resource characteristics to support different functions.

In one or more embodiments, network slices 220A-D can be virtually isolated from each other, and other network slices, e.g., no slice interferes with traffic in another slice. In some circumstances, this isolation can lower the risk of introducing and running new services, and can also support migration, because new technologies or architectures can be launched on isolated slices. This isolation can improve the security of the system, e.g., if a cyberattack breaches one slice the attack may be able to be contained and not be able to spread beyond that slice.

Figure 3:
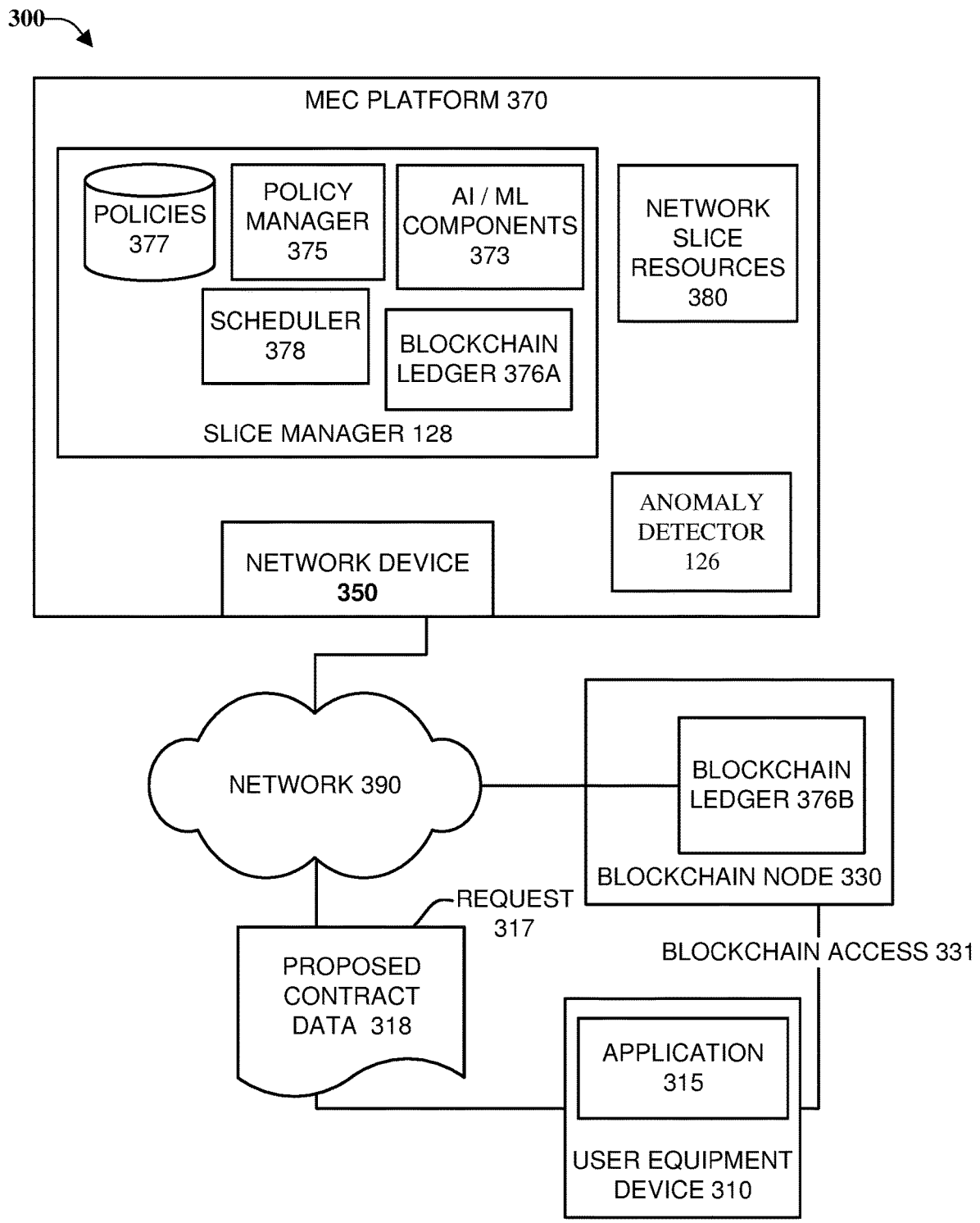
FIG. 3 illustrates a system that can use a multi-access edge computing (MEC) platform to facilitate the allocation, scheduling, and management of network slice resources, in accordance with one or more embodiments.

FIG. 3 illustrates a system 300 that can use multi-access edge computing (MEC) platform 370 to facilitate the allocation, scheduling, and management of network slice resources 380, in accordance with one or more embodiments. For purposes of brevity, description of like elements and/or processes employed in other embodiments is omitted.

As depicted, system 300 can comprise a MEC platform 370 communicatively coupled to user equipment 310 and blockchain node 330 via network 390. MEC platform 370 can include slice manager 128, slice resources 380, and network device 350. In one or more embodiments, MEC platform 370 can facilitate the management of network slices by combining the administration of slice manager 128 with slice resources 380, e.g., in one or more embodiments, hardware and software configured to enable characteristics of slices similar to those discussed above with the description of FIG. 2 above. In some implementations, MEC platform 370 can combine the functions of slice manager 128 and slice resources 380 with a separate network device 350, e.g., in contrast to FIG. 1, where slice manager 128 and anomaly detector 126 can be integrated in network device 150.

In one or more embodiments, slice manager 128 can include policy manager 375, policies 377, artificial intelligence (AL)/machine learning (ML) component 373, scheduler 378, and an instance of blockchain ledger 376A. In an example described below, application 315 can be allocated network slice resources 380 based on proposed agreement data 318 and a governing agreement generated by policy manager 375, in accordance with one or more embodiments.

Application 315 can be similar to one or more of applications 215A-D discussed with FIG. 2 above. For example, application 315 can have specific requirements that can benefit from virtually exclusive resources allocated, not based on a determination by a central provider, but rather based on a request 317 and a determination by slice manager 128 of MEC platform 370 as to what network slice resources are available to be allocated.

In this example, like application 215D discussed above, application 315 can be a video streaming 220D application that can benefit from an allocation of resources by MEC platform 370 that provides high bandwidth 225D. One approach to allocating and managing resources that can be employed by one or more embodiments can facilitate the generation by application 315 of a proposed contract (e.g., represented by proposed agreement data 318) that can specify resources required, conditions under which the resources are used, and other aspects of the use of network slices 195A-B.

To this end, application 315 can generate, via processing resources of UE 310, request 317 with proposed contract data 318 representative of a proposed contract applicable to access a network slice. In this example, MEC platform 370 can allocate a network slice to application 315 based on the high bandwidth 225D requirements of example application 315. In one or more embodiments, application 315 can execute directly from UE 310, based on the resources of UE 310. In alternative or additional embodiments, application 315 can contact an external computing device to facilitate additional functions, e.g., a secondary network-connected application service (not pictured, but, e.g., either centrally managed or distributed) to execute the slice request based on network resourced. By operating from a central location, these other embodiments can facilitate the validation of slice requests by trusted entities. Further, facilitating the execution of application 315 from a location external to UE 310, can enable the operation of application 315 to be modified by network-connected services according to permissions and rights associated with the specific UE 310 or its current operator.

Request 317 can be communicated to MEC platform 370 via network 390 and network device 350, and in one or more embodiments, slice manager 128 can receive proposed contract data 318. In one or more embodiments, based on the proposed contract terms represented by the proposed contract data, policy manager 375 can generate a governing contract, with selected policies 377 of contract terms to govern the allocation of selected network slice resources 380 to application 315. In one or more embodiments, the generated governing contract (also termed a smart contract) can include combinations of network slice resources scheduled for use among allocated slices by scheduler 378.

As noted in examples applications described with FIG. 2 above, example characteristics of network slices can include, but are not limited to, location, speed, connectivity, latency, security, energy use, coverage, and capacity, these characteristics being allocated and limited by, as described below, a governing contract based on the proposed contract data 318.

In one or more embodiments, upon receiving request 317, slice manager 128 can evaluate proposed agreement data 318 and generate a governing contract (e.g., represented by governing contract data) based on factors including, past usage of resources by application 315, past usage of resources by UE 310, available network slice resources 380, estimates of future availability of network slice resources 380, standard conditions for usage given the circumstances, proposed contract data 318, and other similar conditions.

Once generated, governing contract data can be stored in a storage device for subsequent use to control the access by the application to the resources of the network slice. In one or more embodiments, blockchain ledgers 376A-B can be used to provide blockchain functions to features including the access, management and usage of the governing contract. The features including resistance to modification, and access by UE 310 and other outside components, to rule visibility for both certain external parties and the network provider. The use of blockchain ledgers 376A-B and access to blockchain node 330 by UE 310 (e.g., blockchain access 331) are discussed further below with reference to this figure.

Returning to the example above, once generated and stored for use, UE 310 can utilize the resources an allocated network slice, with the utilizing of the resources being controlled by controlling agreement data (e.g., the stored governing contract data described above) representative of a controlling agreement, e.g., the governing contract described above. It should be noted that, as used herein, governing contract and controlling agreement are used interchangeably to describe terms of an allocated slice.

For purposes of implementing one or more embodiments, blockchain ledger entries can, in some circumstances, have advantages over using a database for different functions described herein. As described below, one main difference is that a blockchain is designed to be resistant to modification. Even given security restrictions, database values do not, as performed by blockchain ledgers 376A-B, maintain linkages to past and future entries. In one or more embodiments, as described further below, governing contracts can be stored in blockchain ledgers 376A-B with protective linkages to past and future entries, as well as other advantageous blockchain features described below.

As would be appreciated by one having skill in the relevant art(s), given the description herein, storing contract data in a blockchain involves having a blockchain ledger (e.g., blockchain ledgers 376A-B) that contains blockchain ledger entries that correspond to contract data instances, e.g., the governing contract generated for application 315 discussed above. A new blockchain ledger entry can be based in part (e.g., chained to) previous ledger entries, with a solution to a complex mathematical problem based on previous entries, and specific to the particular blockchain.

In some blockchain implementations used by one or more embodiments, before a new entry is added to a blockchain ledger, the entry can be validated by one or more other systems (e.g., a new entry can be generated by slice manager 128 and validated by blockchain node 330). For example, in one or more embodiments, by utilizing MEC platform 370, the network provider can create ledger entries and provide access to the entries for validation. In additional embodiments, blockchain ledger 376A (e.g., maintained by MEC platform 370) can be copied and stored at external entities for auditing and other confidence building measures, e.g., UE 310 can perform blockchain access 331 of blockchain node 330 both to receive governing contract terms and audit blockchain ledger entries. It should be appreciated that the provider blockchain ledger instance (e.g., blockchain ledger 376A) can be appended to, and maintained at different provider controlled locations, e.g., at eNB network devices, other MEC platforms, the network core, and other usable storage locations. In one or more embodiments, this internal management of blockchain ledger 376A can provide an additional layer of security, while still allowing for distributed verification and management of ledger entries, e.g., blockchain ledger 376B.

Reliance upon previous entries and independent validation are just two blockchain features that can be utilized to improve one or more embodiments. One having skill in the relevant art(s), given the description herein, will appreciate that other blockchain features not described herein, as well as features developed in the future, can be utilized by one or more embodiments without departing from the spirit of the disclosure described herein, e.g., additional blockchain functions can further facilitate application-driven slice membership management, with rule visibility for both application 315 and the network provider.

Figure 4:
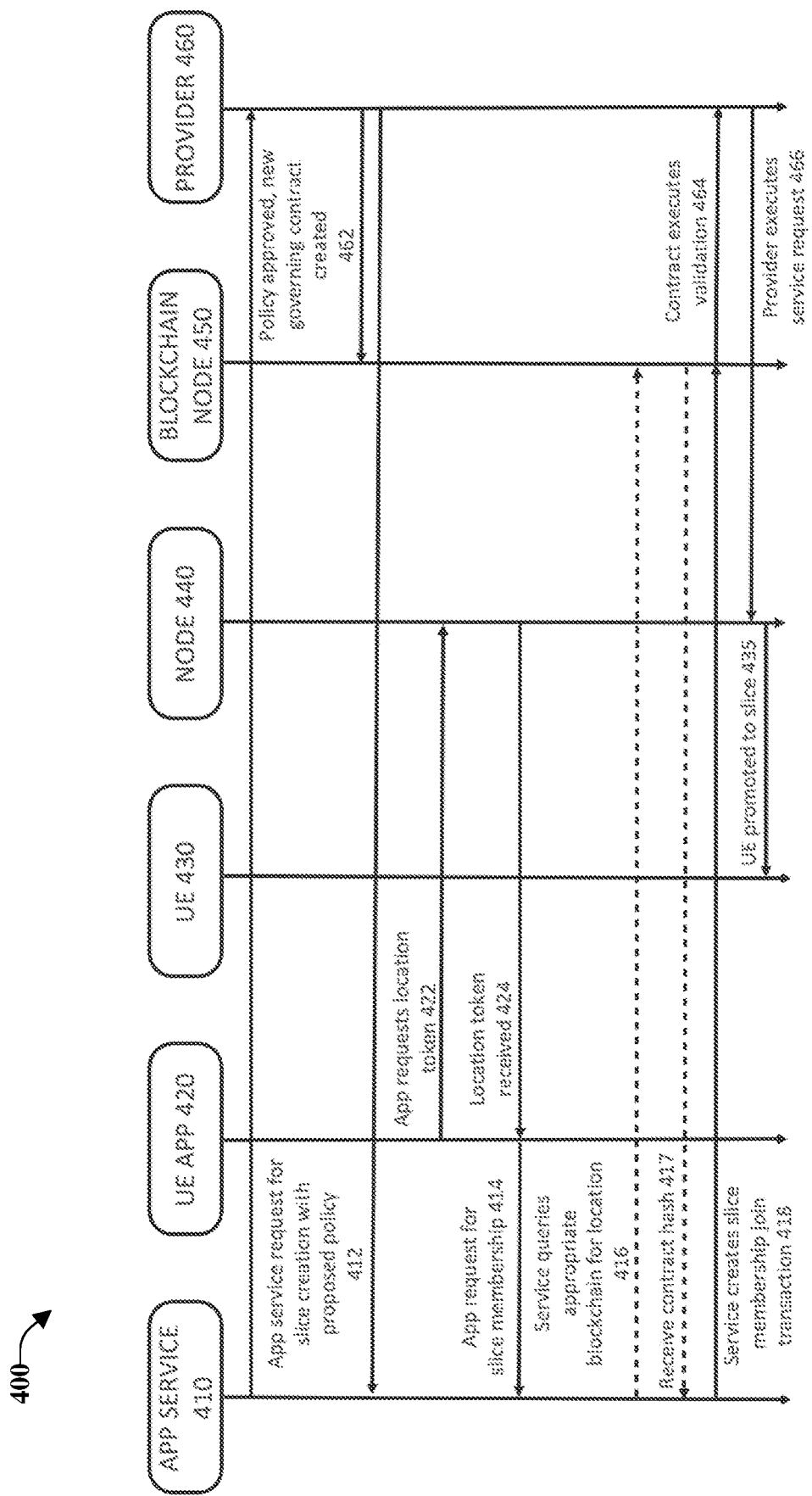
FIG. 4 depicts a diagram that illustrates an example of connections and data exchanged between UE, node, blockchain node, and provider, that can facilitate an application-based network slice request, in accordance with one or more embodiments.
Figure 5:
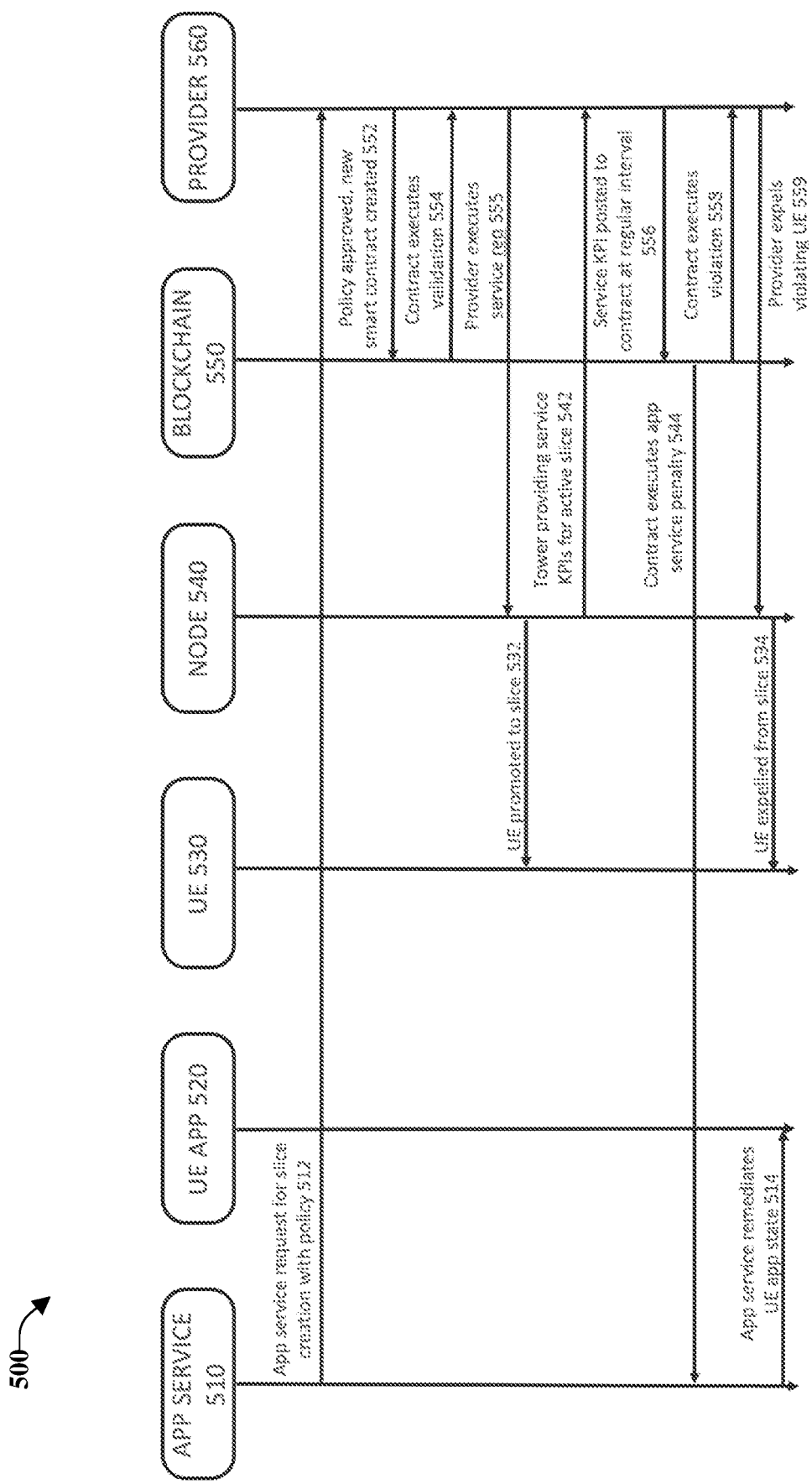
FIG. 5 depicts a flow diagram that illustrates connections and example of data exchanged between UE, node, blockchain node, and provider, that can facilitate the expulsion of UE app from an allocated network slice, in accordance with one or more embodiments.

To provide additional details for the combinations of features described above, FIG. 4 provides messaging and activity diagram describing the proposal and acceptance of governing contract terms for network slices, and FIG. 5 provides a diagram detailing the monitoring of network slice usage and the expulsion of an application from use of an allocated network slice.

FIG. 4 depicts a diagram that illustrates an example 400 of connections and data exchanged between UE 430, node 440, blockchain node 450, and provider 460, that can facilitate an application-based network slice request (e.g., by app service 410 of UE app 420), in accordance with one or more embodiments. For purposes of brevity, description of like elements and/or processes employed in other embodiments is omitted.

At 412, app service 410 issues a request 317 to have resources of a network slice 195A allocated for the use of the app service of UE app 420. In one or more embodiments the generated request can include proposed agreement data 318 representative of a proposed agreement applicable to access resources of a network slice. Additionally, as noted above, one or more embodiments can involve execution of the application service on the UE 430, whereas in one or more additional or alternative embodiments, app service 410 can be executed by a secondary network-connected resource (not pictured) that is either managed centrally or through distributed means. At 462, provider 460 can review the proposed agreement and generate and communicate to app service 410, a governing contract to control the access by UE app 420 to the resources of the network slice.

In the one or more embodiments depicted in FIG. 4, a location condition can be a part of the control of the network slice implemented by provider 460. One way to implement a location condition is to set a location where the resources of the network slice can be utilized. For example, in 422 UE app 420 can request a location token from node 440, and at 424, node 440 can provide a location token that allows UE 430 to establish that it within a particular location boundary, e.g. within range of node 440. In one or more alternative embodiments, UE 430 can use alternative approaches to determining a location of UE 430, for later submission during validation processes discussed below. At 424, the location token is received buy UE app 420 and, based on a request for slice membership 414 by app service 410, service 410 is granted access to request permission to join the allocated slice.

In this example, at 416, the app service 410 queries blockchain node 450 to confirm the location specified in the location token is valid for slice membership. Based on the location being valid, blockchain node 450, at block 417, blockchain 450 can provide a contract hash to app service 410. Based on this contract hash, app service 410 can create a slice membership transaction for validation by blockchain node 450 and, at 464, validation by provider 460. Based on this validation, at 466, provider can relay a request for service to node 440, requesting a promotion of UE 430 to membership in the allocated slice. Once UE 430 is promoted, UE app 420 can be allocated services required for the operation of app service 410.

In an example that illustrates different features described above, slice allocation can be beneficially performed for first responders in need of special privileges for emergency response. In an example, a proposed contract is provided by a UE identified as being used by a first responder. Example conditions requested can include, but are not limited to, allocated use of certain network ports for a secure connection to appropriate data sources (e.g., site and medical information), and high bandwidth 225D for video streaming 220D capability.

After receipt of the conditions above (e.g., represented by proposed contract data 318 in request 317), slice manager can evaluate request 317 and generate a governing contract for use by UE 430. For example, when considering the requested service conditions, policy manager 375 can review basic conditions applicable to this type of requestor (e.g., a service level agreement (SLA) in place), past governing contracts to this type of customer (e.g., by a query of blockchain ledger 376A), available network slice resources 380 for the location of user device 430 (e.g., a network location token can be submitted as a part of request 317), and other similar factors.

In this example, based on the above factors, the requested exclusive use of ports is granted, but the high bandwidth 225D for video streaming 220D capability is not permitted by the governing contract, e.g., because a triage of available resources for the location determines that less allocated resources for UE 430 can provide more needed resources for other responding parties. Based on this governing contract, resources associated with a network slice are granted to UE 430. This example is discussed further below in the context of anomalous activity that can violate the governing contract and, in some circumstances (e.g., not normally for first responder requirements), cause expulsion from the allocated slice.

In another example, when first responder UE 430 leaves geographic proximity to an emergency event, this change can be detected (e.g., by the location services of 5G connectivity), and blockchain 450 can be used to confirm the conditions of the governing contract are not violated by this new location. In an expulsion process described with FIG. 5 below, because an anomalous condition (e.g., change of location) is detected, different processes for provider 460 can be triggered, including either adapting the governing conditions to encompass the anomalous conditions or triggering the expulsion process for UE 430 from the allocated network slice.

FIG. 5 depicts a flow diagram 500 that illustrates connections and example of data exchanged between UE 530, node 540, blockchain node 550, and provider 560, that can facilitate the expulsion of UE app 520 from an allocated network slice, in accordance with one or more embodiments. For purposes of brevity, description of like elements and/or processes employed in other embodiments is omitted.

One or more embodiments can use the above described features further for the definition and discovery of expulsion criteria for governing contract violations and anomalies in usage that can be indicative of violations. For example, in one or more embodiments, by monitoring slice activity across the network (e.g., by anomaly detector 126), a provider can determine policy violations/anomalies for use in the expulsion from, or modification of, allocated network slices. It is important to note that, by utilizing blockchain ledgers 376A-B, governing contracts, and the terms of expulsion from slices governed by these contracts, can be transparently published for external access, such that network slice membership can be verified with the application owner and justly terminated for violating policies, e.g., further to promote confidence in the operation of the system.

For example, in an example depicted in FIG. 5, at 512, app service 510 of UE 530 can communicate a request 317 for slice creation, including proposed contract data 318 to provider 560 via node 540. As described above, proposed contract data 318 can be reviewed, and selected terms can used to generate a governing contract for the requested connection, and at 552, the governing contract can be appended in a ledger entry to blockchain 550. At 554, the entry can be validated (e.g., by blockchain node 330), and at 555, provider executes service requirements to request allocation of resources by node 540.

At 532, node 540 can promote UE 530 to membership in the generated network slice. It should be appreciated that, as used herein, UEs and applications can be described as being promoted to using resources allocated in a network slice, with promotion being used, by one or more embodiments to described upgrading the resources available to the applications as compared to non-allocated resources.

In one approach used by one or more embodiments to maintain service levels allocated to a network slice (e.g., low-latency, high-bandwidth), key performance indicators (KPIs) can be measured and reported at different points in the delivery of resources. For example, at 542, a tower providing wireless connectivity to UE 530 (e.g., node 540) can collect KPIs associated with allocated resources. Returning to the first responder allocations described above, for the network slice assigned to the first responder UE 530, KPIs associated with port exclusivity, bandwidth and other measurements can be collected and relayed to provider 560. In addition to providing data to facilitate the maintaining of the service levels of the network slice, the KPIs collected by different components can be used to detect anomalous behavior, e.g., activity by UE app 520 that potentially violates the terms of the governing contract.

At 556, one or more embodiments can assess the collected KPIs by reading conditions stored in blockchain 550, and if activity outside of the activity authorized by the governing contact is detected, at 544 an app service penalty can be assessed on UE 530. In addition, at 558, the detected violation can be communicated to provider 560, and an assessment of the violation can be made at provider 560, along with potential remedies, e.g., expulsion from the network slice or, in an opposite approach, upgrading the terms of the governing contract to encompass the detected behavior. In the example depicted in FIG. 5, at 559, provider 560 expels UE 530 for violating the terms of the governing contract, but alternative approaches are described below.

Continuing with to the first responder example discussed above, in an example of aspects of the above-described expulsion analysis, UE 530 operated by first responders, attempts to turn on video feed for an on-site surgical operation, this being restricted by the example governing contract described above. Based on the execution of this video function by UE 530, node 540 can detect the high-bandwidth requested for delivery of the requested video. In one or more embodiments, this KPI condition can be identified as an anomalous condition, and communicated to blockchain 550 for analysis and confirmation. Upon a determination that the request for video by UE 530 violates the terms of the governing contract, provider 560 can perform a range of functions, including reevaluating factors that led to the initial restriction (e.g., congestion from other priority devices), and after revaluation, determining to enable the video transfer, because the video bandwidth can be accommodated by the available resources. Alternatively, provider 560 can trigger an expulsion of UE 530 from the allocated slice as described in the previous example.

To avoid the expulsion described above (e.g., especially for first responders), one approach that can be implemented allows UEs 530 operated by first responders (or other priority uses) that have been assigned a lower level of priority (e.g., the prohibition of video streaming described above) to request a priority uplift. This uplift can be reviewed and approved by provider 460, as well as locally, by a first responder command post manager for the emergency. Once approved the resources available to an allocated slice can be upgraded. In additional embodiments, the ability to request priority uplift can be made available upon entering a proximity to an emergency (e.g., from 5-50 miles), thus enabling the allocation of resources to begin before arriving at an emergency location. In an alternative embodiment, in some circumstances priority uplift could be automated and not require command post manager approval (automation could be based on location, priority, etc.).

In another example of monitoring, analysis, and expulsion, in one or more embodiments, UAVs and other vehicles, as noted above, can require ultra-low latency for effective operation. In addition, these systems, also having operating systems, applications and media, can periodically require system updates. In one or more embodiments, as a part of a governing contract, terms can be included that recognize that the timing of update downloads can be significant for the operation of the vehicles, e.g., downloading large blocks while controlling a vehicle can interfere with the required low-latency operation of the vehicles.

In this example, the commencement of a system update download can be detected by KPIs in the system (e.g., at node 540), and these conditions can be compared to the governing contract term stored in blockchain 550, with further analysis performed to consider whether the vehicle is idle (e.g., an appropriate time) or whether the vehicle is operational and in need of low-latency connectivity. Upon determination of idleness, the download operation can be permitted, and a RAN priority downgrade can be requested to be performed, e.g., ultra-low latency connections can use a significant amount of system resources, and the connections are not required for system upgrades. Upon a determination that the vehicle is not idle, the download operation can be paused until a later time. In an additional embodiment, along with the pause, UE 530 can be expelled from the network slice, having to re-authenticate when the vehicle is idle and can resume the update.

Figure 6:
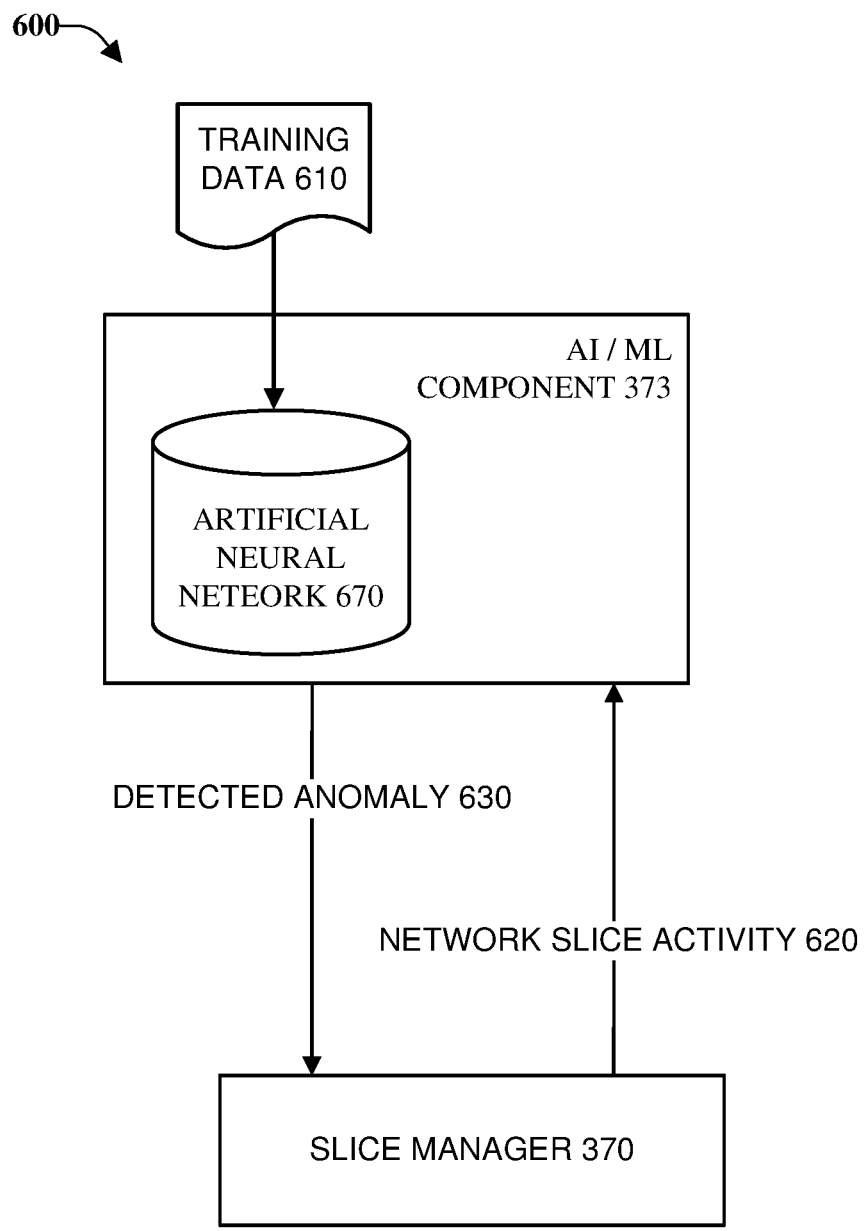
FIG. 6 illustrates an implementation of an example, non-limiting system that can facilitate predicting detecting anomalous use of network slices by employing an artificial intelligence (AI)/machine learning (ML) component that can include for example, an artificial neural network (ANN), in accordance with one or more embodiments described herein.

FIG. 6 illustrates an implementation of an example, non-limiting system 600 that can facilitate detecting anomalous uses of network slices by employing an artificial intelligence (AI)/machine learning (ML) component 373 that can include for example, artificial neural network (ANN) (also termed "neural network" or "network" herein) 670, in accordance with one or more embodiments described herein. Repetitive description of like elements and/or processes employed in respective embodiments is omitted for sake of brevity.

In certain embodiments, anomalous activity can be detected based on classifications, correlations, inferences and/or expressions associated with principles of artificial intelligence. For example, AI/ML component 373 can employ expert systems, fuzzy logic, SVMs, Hidden Markov Models (HMMs), greedy search algorithms, rule-based systems, Bayesian models (e.g., Bayesian networks), ANNs, other non-linear training techniques, data fusion, utility-based analytical systems, systems employing Bayesian models, etc.

In another aspect, AI/ML component 373 can perform a set of machine learning computations associated with the detection of different network conditions. For example, AI/ML component 373 can perform reinforcement learning analysis, a set of clustering machine learning computations, a set of logistic regression machine learning computations, a set of decision tree machine learning computations, a set of random forest machine learning computations, a set of regression tree machine learning computations, a set of least square machine learning computations, a set of instance-based machine learning computations, a set of regression machine learning computations, a set of support vector regression machine learning computations, a set of k-means machine learning computations, a set of spectral clustering machine learning computations, a set of rule learning machine learning computations, a set of Bayesian machine learning computations, a set of deep Boltzmann machine computations, a set of deep belief network computations, and a set of different machine learning computations to analyze network data, and detect anomalous activities in allocated network slices.

In an example AI/ML approach that can be utilized by one or more embodiments, ANN 670 can be optimized (also termed "trained" herein) by submitting optimizing data to the network. It should be noted that this description of employing an ANN is non-limiting, e.g., one or more embodiments can use other types of machine learning algorithms that receive input and perform analysis, e.g., as described above.

In one or more embodiments, to facilitate the use of ANN 670 for anomaly detection, training data 610 can be created by combining operational data with confirmed conclusions about the operational data. For example, an immediate shift from low-bandwidth requirements to high-bandwidth indicates video is being streamed to a UE (e.g., as in the first responder example described above), and when an application utilizing ultra-low latency transitions to large data downloads, this indicates a system update is being performed on a system that requires low latency in other contexts (e.g., as in the UAV example described above). As would be appreciated by one having skill in the relevant art(s), given the description herein, training data 610 can be used to train the artificial neurons of ANN 670 such that, over time, ANN 670 can accurately analyze network slice activity 620 (e.g., from slice manager 128) and produce data corresponding to detected anomalies 630.

Figure 7:
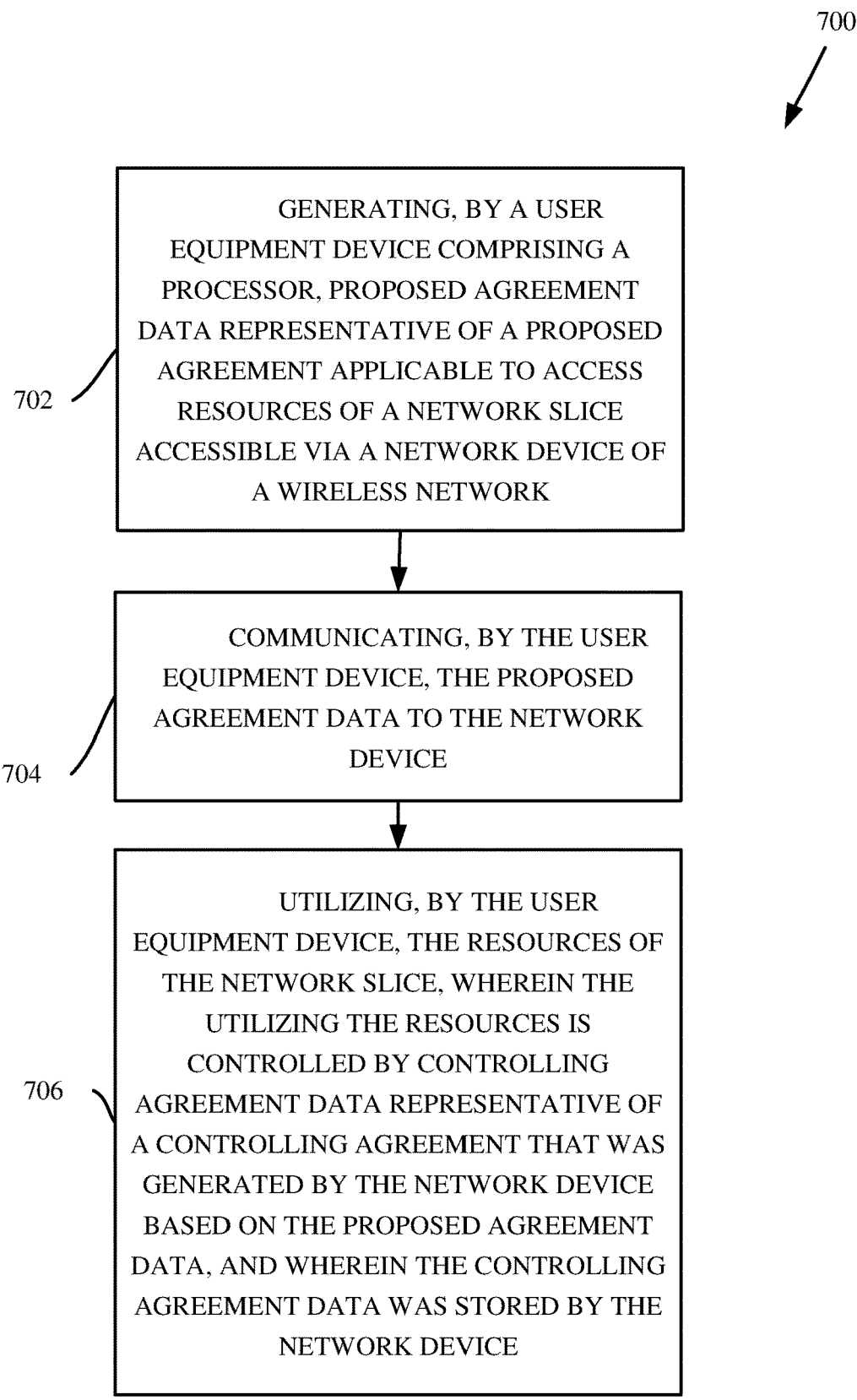
FIG. 7 illustrates a flow diagram of an example method that can facilitate the allocation, scheduling, and management of network slice resources, in accordance with one or more embodiments.

FIG. 7 illustrates a flow diagram of an example method 700 that can facilitate the allocation, scheduling, and management of network slice resources, in accordance with one or more embodiments. For purposes of brevity, description of like elements and/or processes employed in other embodiments is omitted.

At 702, example method 700 can generate, by a user equipment device comprising a processor, proposed agreement data representative of a proposed agreement applicable to access resources of a network slice accessible via a network device of a wireless network. In an embodiment, method 700 can generate (e.g., by application 315), by a user equipment device comprising a processor (e.g., processor 902 of mobile handset 900), proposed agreement data 318 representative of a proposed agreement applicable to access resources of a network slice (e.g., network slice resources 380) accessible via a network device 350 of a wireless network 190.

At 704, example method 700 can communicate, by the user equipment device, the proposed agreement data to the network device. In an embodiment, the method can communicate, by the user equipment device (e.g., processor 902 of mobile handset 900), the proposed agreement data 318 to the network device 350.

At 706, example method 700 can utilize, by the user equipment device, the resources of the network slice, wherein the utilizing the resources is controlled by controlling agreement data representative of a controlling agreement that was generated by the network device based on the proposed agreement data, and wherein the controlling agreement data was stored by the network device. In an embodiment, method 700 can utilize, by the user equipment device (e.g., processor 902 of mobile handset 900), the resources of the network slice (e.g., network slice resources 380), wherein the utilizing the resources is controlled by controlling agreement data representative of a controlling agreement that was generated (e.g., by policy manager 375) by the network device 350 based on the proposed agreement data 318, and wherein the controlling agreement data was stored (e.g., in blockchain ledger 376A) by the network device 350.

Figure 8:
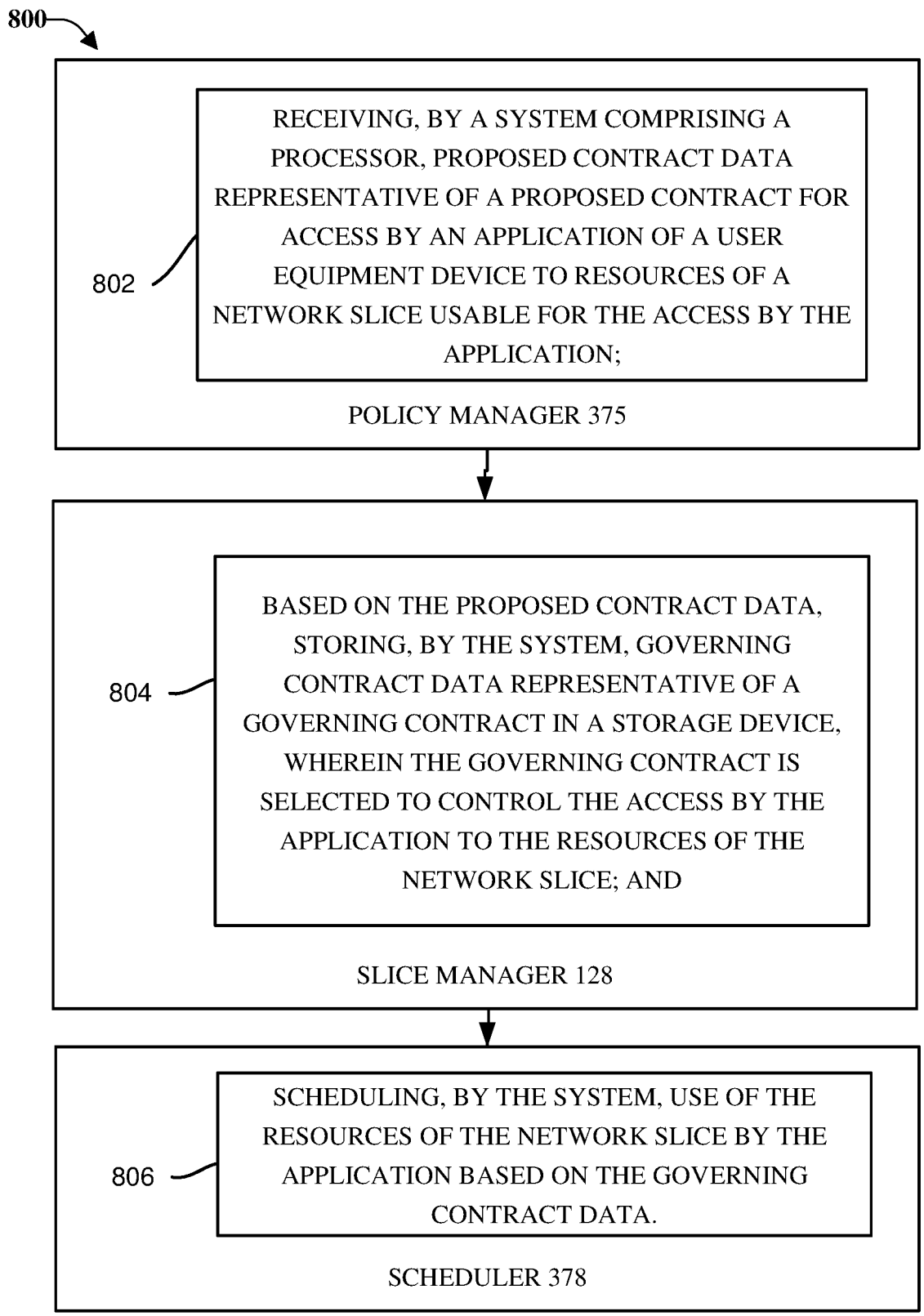
FIG. 8 illustrates a flow diagram of an example method that can facilitate the allocation, scheduling, and management of network slice resources, in accordance with one or more embodiments.

FIG. 8 illustrates a flow diagram of an example system 800 that can facilitate the allocation, scheduling, and management of network slice resources, in accordance with one or more embodiments. For purposes of brevity, description of like elements and/or processes employed in other embodiments is omitted.

At 802, example system 800 can receive proposed contract data representative of a proposed contract for access by an application of a user equipment device to resources of a network slice usable for the access by the application. In an embodiment, system 300 can receive (e.g., by policy manager 375) proposed contract data 318 representative of a proposed contract for access by an application 315 of UE 310 to resources of a network slice (e.g., network slice resources 380) usable for the access by the application 315.

At 804, example system 800 can, based on the proposed contract data, store governing contract data representative of a governing contract in a storage device, wherein the governing contract is selected to control the access by the application to the resources of the network slice. In an embodiment, system 300 can, based on the proposed contract data 318, store (e.g., by slice manager 128) governing contract data (e.g., generated by policy manager 375) representative of a governing contract in a storage device (e.g., blockchain ledger 376A), wherein the governing contract is selected to control the access by the application 315 to the resources of the network slice (e.g., network slice resources 380).

At 806, example system 800 can schedule use of the resources of the network slice by the application based on the governing contract data. In an embodiment, system 300 can, schedule (e.g., by scheduler 378) use of the resources of the network slice 195A by the application 315 based on the governing contract data (e.g., generated by policy manager 375).

As can be seen, the technology described herein provides for increased robustness and reduced latency of initial access and V2X configuration when control plane and mobility signaling is provided over a sub6-GHz anchor link via multi-connectivity, (compared to a standalone architecture), in which V2X-capable UEs provide initial access, IDLE mode, control plane, and mobility functionality. The technology facilitates reduced overhead on mmWave backhaul links multiplexing cellular and V2X traffic (of one or more bands) by utilizing sub 6-GHz channels for control plane signaling instead of multiplexing both control and data links on mmWave bands. Still further, the technology described herein provides the ability to efficiently perform local manager configuration and association based on measurements/reports related to sidelink link quality metrics over sub6-GHz channels more efficiently than over the NR mmWave backhaul links. The technology described herein enables support for simultaneous cellular communication with a network infrastructure, in addition to V2X direct communication services on the same or different carriers.

Figure 9:
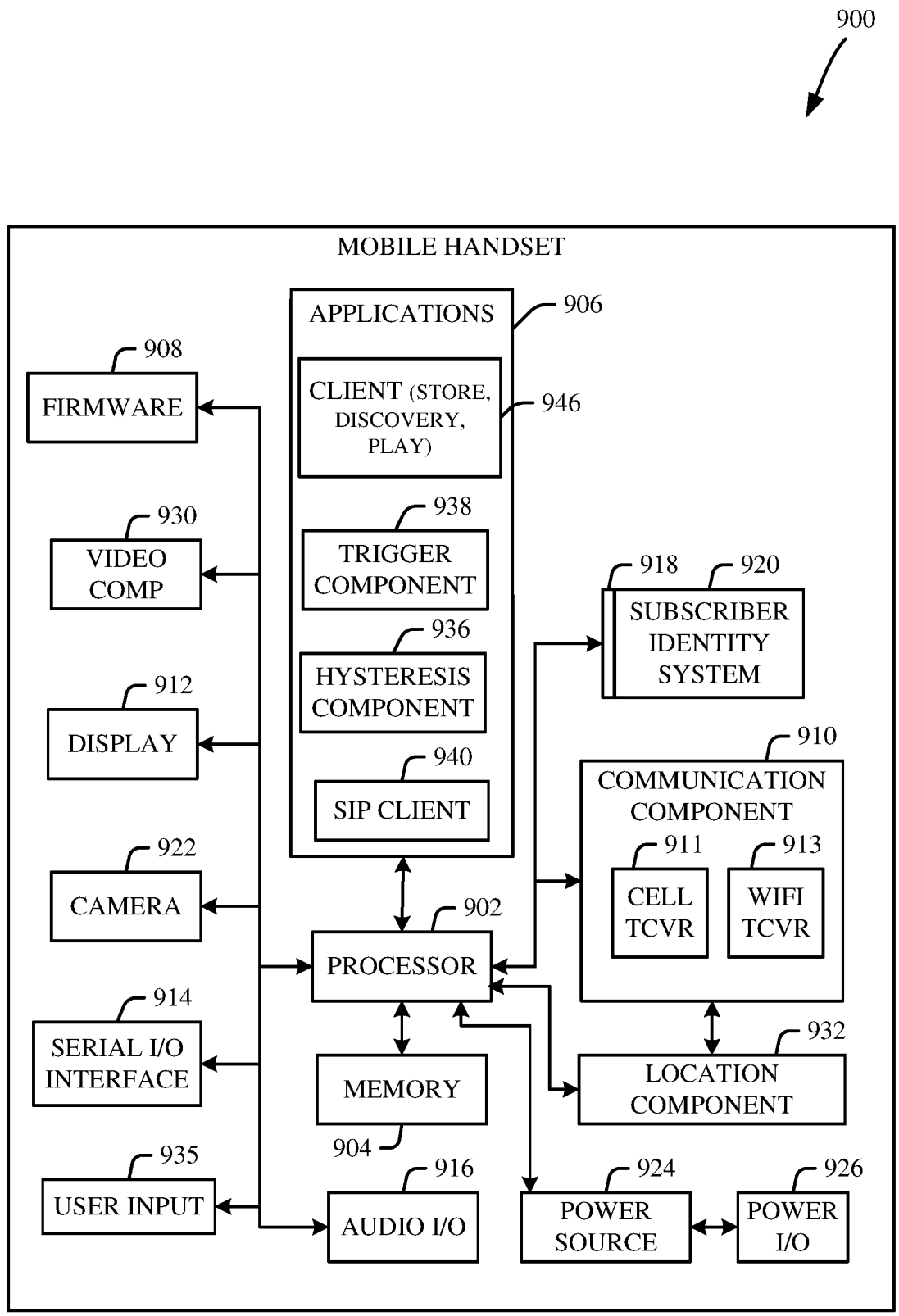
FIG. 9 illustrates an example block diagram of an example mobile handset operable to engage in a system architecture that can facilitate processes described herein, in accordance with one or more embodiments.

Referring now to FIG. 9, illustrated is an example block diagram of an example mobile handset 900 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media The handset includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1294) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communications component 910 to accommodate IP traffic from an IP network such as, for example, the Internet, a corporate intranet, a home network, a person area network, etc., through an ISP or broadband cable provider. Thus, VoIP traffic can be utilized by the handset 900 and IP-based multimedia content can be received in either an encoded or a decoded format.

A video processing component 922 (e.g., a camera) can be provided for decoding encoded multimedia content. The video processing component 922 can aid in facilitating the generation, editing, and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 936 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 910, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

As discussed in FIGS. 1 and 3, network 190 can include a wireless communication system, and thus can include one or more communication service provider networks that facilitate providing wireless communication services to various user equipments, including UEs 140A-B and 310, via the network devices 150 and 350 and/or various additional network devices (as is understood) included in the one or more communication service provider networks. The one or more communication service provider networks can include various types of disparate networks, including but not limited to: cellular networks, femto networks, picocell networks, microcell networks, internet protocol (IP) networks Wi-Fi service networks, broadband service network, enterprise networks, cloud based networks, and the like. For example, in at least one implementation, system 100 can be or include a large scale wireless communication network that spans various geographic areas. According to this implementation, the one or more communication service provider networks can be or include the wireless communication network and/or various additional devices and components of the wireless communication network (e.g., additional network devices and cell, additional user equipments, network server devices, etc.).

The network device 350 can be connected to one or more communication service provider networks via one or more backhaul links or the like (not shown). For example, the one or more backhaul links can comprise wired link components, such as a T1/E1 phone line, a digital subscriber line (DSL) (e.g., either synchronous or asynchronous), an asymmetric DSL (ADSL), an optical fiber backbone, a coaxial cable, and the like.

Network 190 can employ various cellular systems, technologies, and modulation schemes to facilitate wireless radio communications between devices (e.g., UEs 140A-B and 310, and the network devices 150 and 350). While example embodiments include use of 5G new radio (NR) systems, one or more embodiments discussed herein can be applicable to any radio access technology (RAT) or multi-RAT system, including where user equipments operate using multiple carriers, e.g. LTE FDD/TDD, GSM/GERAN, CDMA2000, etc. For example, wireless communication system 200 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs 140A-B and the network device 150) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the user equipment. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, the system 100 can be configured to provide and employ 5G wireless networking features and functionalities. With 5G networks that may use waveforms that split the bandwidth into several sub bands, different types of services can be accommodated in different sub bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Figure 10:
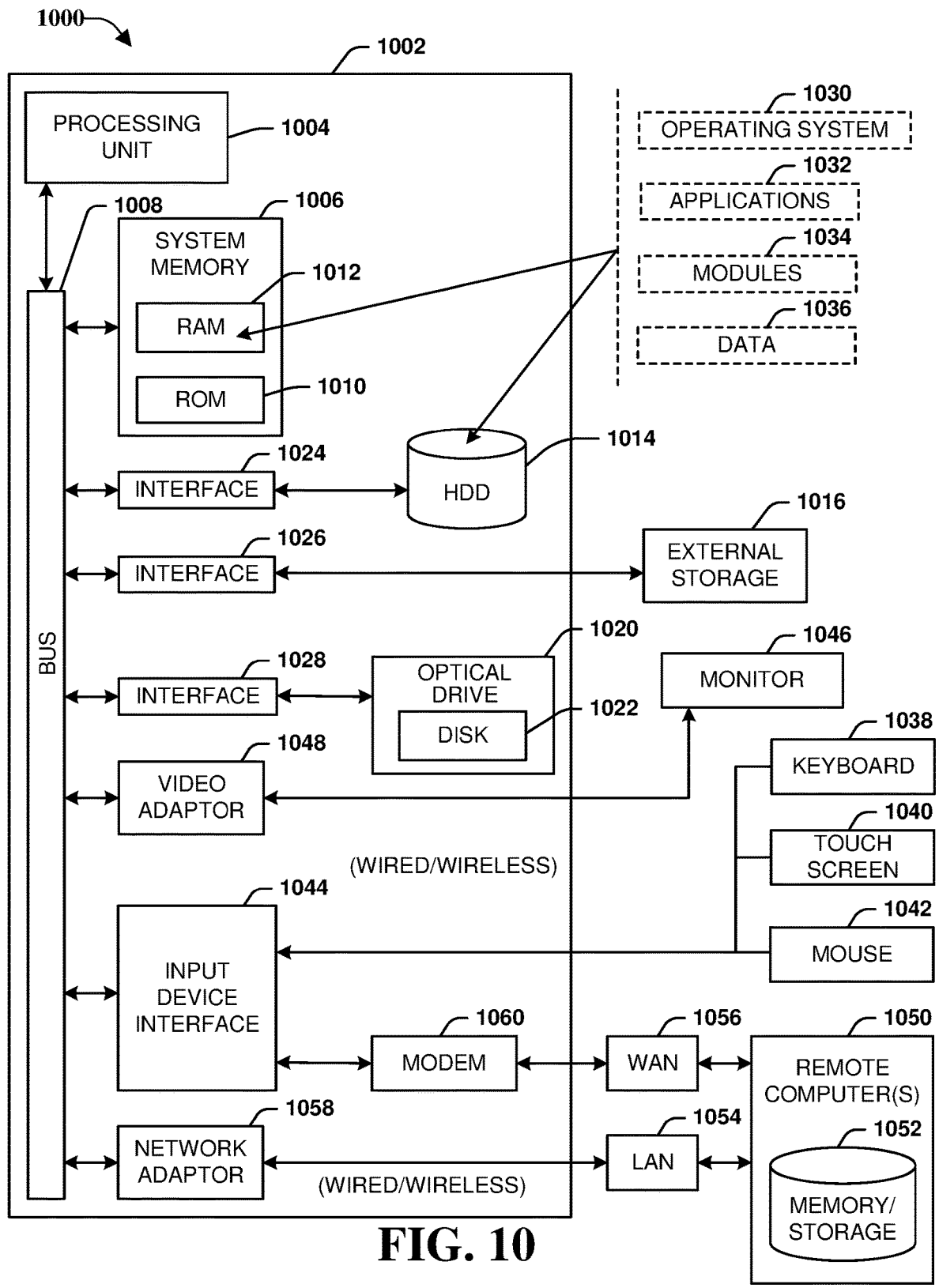
FIG. 10 illustrates an example block diagram of an example computer operable to engage in a system architecture that can facilitate processes described herein, in accordance with one or more embodiments.

Referring now to FIG. 10, illustrated is an example block diagram of an example computer 1000 operable to engage in a system architecture that facilitates wireless communications according to one or more embodiments described herein. The computer 1000 can provide networking and communication capabilities between a wired or wireless communication network and a server (e.g., Microsoft server) and/or communication device. In order to provide additional context for various aspects thereof, FIG. 10 and the following discussion are intended to provide a brief, general description of a suitable computing environment in which the various aspects of the embodiments can be implemented to facilitate the establishment of a transaction between an entity and a third party. While the description above is in the general context of computer-executable instructions that can run on one or more computers, those skilled in the art will recognize that the embodiments also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the embodiments can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules, or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

The techniques described herein can be applied to any device or set of devices (machines) capable of running programs and processes. It can be understood, therefore, that servers including physical and/or virtual machines, personal computers, laptops, handheld, portable and other computing devices and computing objects of all kinds including cell phones, tablet/slate computers, gaming/entertainment consoles and the like are contemplated for use in connection with various implementations including those exemplified herein. Accordingly, the general purpose computing mechanism described below with reference to FIG. 10 is but one example of a computing device.

In order to provide a context for the various aspects of the disclosed subject matter, FIG. 10 and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that perform particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory, by way of illustration, and not limitation, volatile memory 1020 (see below), nonvolatile memory 1022 (see below), disk storage 1024 (see below), and memory storage 1046 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of an operating environment 1000 operable to execute the disclosed systems and methods in accordance with an embodiment. Computer 1012, which can be, for example, part of the hardware of system 1020, includes a processing unit 1004, a system memory 1006, and a system bus 1008. System bus 1008 couples system components including, but not limited to, system memory 1006 to processing unit 1004. Processing unit 1004 can be any of various available processors. Dual microprocessors and other multiprocessor architectures also can be employed as processing unit 1004.

System bus 1008 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics, VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

System memory 1006 can include volatile memory 1020 and nonvolatile memory 1022. A basic input/output system (BIOS), containing routines to transfer information between elements within computer 1012, such as during start-up, can be stored in nonvolatile memory 1022. By way of illustration, and not limitation, nonvolatile memory 1022 can include ROM, PROM, EPROM, EEPROM, or flash memory. Volatile memory 1020 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 can also include removable/non-removable, volatile/non-volatile computer storage media. FIG. 10 illustrates, for example, disk storage 1024. Disk storage 1024 includes, but is not limited to, devices like a magnetic disk drive, floppy disk drive, tape drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to system bus 1008, a removable or non-removable interface is typically used, such as interface 1026.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. In an aspect, tangible media can include non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. For the avoidance of doubt, the term "computer-readable storage device" is used and defined herein to exclude transitory media. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software includes an operating system 1028. Operating system 1028, which can be stored on disk storage 1024, acts to control and allocate resources of computer 1012. System applications 1030 take advantage of the management of resources by operating system 1028 through program modules 1032 and program data 1034 stored either in system memory 1006 or on disk storage 1024. It is to be noted that the disclosed subject matter can be implemented with various operating systems or combinations of operating systems.

A user can enter commands or information into computer 1012 through input device(s) 1036. As an example, a mobile device and/or portable device can include a user interface embodied in a touch sensitive display panel allowing a user to interact with computer 1012. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1004 through system bus 1008 by way of interface port(s) 1038. Interface port(s) 1038 include, for example, a serial port, a parallel port, a game port, a universal serial bus (USB), an infrared port, a Bluetooth port, an IP port, or a logical port associated with a wireless service, etc. Output device(s) 1040 and a move use some of the same type of ports as input device(s) 1036.

Thus, for example, a USB port can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 include, by way of illustration and not limitation, video and sound cards that provide means of connection between output device 1040 and system bus 1008. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, cloud service, a workstation, a microprocessor based appliance, a peer device, or other common network node and the like, and typically includes many or all of the elements described relative to computer 1012.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit-switching networks like Integrated Services Digital Networks (ISDN) and variations thereon, packet switching networks, and Digital Subscriber Lines (DSL). As noted below, wireless technologies may be used in addition to or in place of the foregoing.

Communication connection(s) 1050 refer(s) to hardware/software employed to connect network interface 1048 to bus 1008. While communication connection 1050 is shown for illustrative clarity inside computer 1012, it can also be external to computer 1012. The hardware/software for connection to network interface 1048 can include, for example, internal and external technologies such as modems, including regular telephone grade modems, cable modems and DSL modems, ISDN adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "network device," "access point (AP)," "base station," "NodeB," "evolved Node B (eNodeB)," "home Node B (HNB)," "home access point (HAP)," "cell device," "sector," "cell," and the like, are utilized interchangeably in the subject application, and refer to a wireless network component or appliance that can serve and receive data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. User equipments do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

While the various embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope of the various embodiments.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather is to be construed in breadth, spirit and scope in accordance with the appended claims.

What is claimed is:

1. A method, comprising:
   receiving, by network equipment comprising a processor, proposed contract data representative of a proposed contract for access by a user equipment to resources of a network slice usable for the access by the user equipment;
   based on the proposed contract data, identifying, by the network equipment, governing contract data representative of a governing contract, wherein the governing contract is identified to control the access by the user equipment to the resources of the network slice;
   based on the governing contract data, scheduling, by the network equipment, use of the resources of the network slice by the user equipment;
   detecting, by the network equipment, a condition of the access that is not encompassed by the governing contract, resulting in a detected condition; and
   based on the detected condition, terminating, by the network equipment, the access to the resources of the network slice by the user equipment.

2. The method of claim 1, further comprising storing, by the network equipment, the governing contract data in a blockchain ledger by appending an information block corresponding to the governing contract data to the blockchain ledger.

3. The method of claim 2, wherein facilitating the appending of the information block comprises communicating a request to blockchain equipment to generate the information block based on previous blocks in the blockchain ledger stored prior to the information block.

4. The method of claim 1, further comprising:
   receiving, by the network equipment, a location of the user equipment; and
   validating, by the network equipment, the scheduling of the use of the resources of the network slice by the user equipment based on the location of the user equipment and the governing contract data.

5. The method of claim 1, further comprising:
   generating, by the network equipment, the governing contract data by analyzing the proposed contract data; and
   modifying, by the network equipment, the proposed contract of the proposed contract data based on predetermined terms.

6. The method of claim 1, further comprising, communicating, by the network equipment, the governing contract data to the user equipment to control the access to the resources of the network slice according to terms of the governing contract.

7. The method of claim 1, wherein detecting the condition of the access comprises detecting an anomaly in the access to the resources of the network slice by the user equipment.

8. The method of claim 7, wherein detecting the anomaly comprises detecting the anomaly based on a criterion obtained from an anomaly criteria store.

9. The method of claim 7, further comprising, training, by the network equipment, an artificial neural network based on monitored network activity, and wherein detecting the anomaly comprises employing the artificial neural network to detect the anomaly.

10. A system, comprising:

a processor; and a memory that stores executable instructions that, when executed by the processor, facilitate performance of operations, comprising:

generating proposed agreement data representative of a proposed agreement applicable to access resources of a network slice accessible via network equipment;

communicating the proposed agreement data to the network equipment;

utilizing the resources of the network slice, wherein utilizing the resources is controlled by controlling agreement data representative of a controlling agreement that was generated by the network equipment based on the proposed agreement data; and receiving, from the network equipment:

a first indication that a condition, associated with the utilizing of the resources of the network slice and that is not encompassed by the controlling agreement, has been detected, and a second indication comprising second information that access to the resources of the network slice has been terminated.

11. The system of claim 10, wherein the operations further comprise:

receiving the controlling agreement data from network storage equipment comprising blockchain information corresponding to a blockchain ledger, and wherein the controlling agreement data comprises agreement information corresponding to an information block that was appended to the blockchain ledger.

12. The system of claim 11, wherein the operations further comprise, validating the controlling agreement data by analyzing the information block in the blockchain ledger and previously linked information blocks in the blockchain ledger.

13. The system of claim 11, wherein the operations further comprise, validating the controlling agreement data by receiving an indication from blockchain node equipment, and wherein the indication is based on an analysis, by the blockchain node equipment, of the information block and the previously linked information blocks.

14. The system of claim 13, wherein the operations further comprise:

determining location data representative of a location of the system; and communicating the location data to the blockchain node equipment, wherein the analysis of the controlling agreement data is further based on the location data.

15. The system of claim 10, wherein the second information further comprises that the access was terminated based on the condition.

16. The system of claim 10, wherein the operations further comprise, participating in an anomalous event, and wherein the condition comprises participating in the anomalous event.

17. A non-transitory machine-readable medium, comprising executable instructions that, when executed by a processor, facilitate performance of operations, comprising:

generating proposed agreement data representative of a proposed agreement applicable to access resources of a network slice accessible via network equipment;

communicating the proposed agreement data to the network equipment;

utilizing the resources of the network slice, wherein utilizing the resources is controlled by controlling agreement data representative of a controlling agreement that was generated by the network equipment based on the proposed agreement data, and wherein the controlling agreement data was stored by the network equipment; and receiving, from the network equipment:

a first indication that a condition, associated with the utilizing of the resources of the network slice and that is not encompassed by the controlling agreement, has been detected, and a second indication that, at least partly as a result of the condition, access to the resources of the network slice has been terminated.

18. The non-transitory machine-readable medium of claim 17, wherein the operations further comprise:

receiving the controlling agreement data from network storage equipment comprising blockchain information corresponding to a blockchain ledger, and wherein the controlling agreement data comprises agreement information corresponding to an information block that was appended to the blockchain ledger, having resulted in an appended information block.

19. The non-transitory machine-readable medium of claim 18, wherein the operations further comprise, validating the controlling agreement data by analyzing the appended information block and previously linked information blocks in the blockchain ledger.

20. The non-transitory machine-readable medium of claim 18, wherein the operations further comprise:

receiving location information corresponding to a location, and validating the access by to the resources of the network slice based on analyzing the appended information block and the location information.

* * * * *